US005276804A

United States Patent [19]

Ishiyama

[11] Patent Number: 5,276,804

[45] Date of Patent: Jan. 4, 1994

[54] DISPLAY CONTROL SYSTEM WITH MEMORY ACCESS TIMING BASED ON DISPLAY MODE

[75] Inventor: Yukio Ishiyama, Kamakura, Japan

[73] Assignee: Mitsubishi Denki Kabushiki Kaisha, Tokyo, Japan

[21] Appl. No.: 833,644

[22] Filed: Feb. 10, 1992

Related U.S. Application Data

[63] Continuation of Ser. No. 343,048, Apr. 25, 1989, abandoned.

[30] Foreign Application Priority Data

Apr. 27, 1988 [JP] Japan ..................... 63-104756

[51] Int. Cl.$^5$ ..................... G06F 3/14; G06F 13/14

[52] U.S. Cl. ..................... 395/164; 395/725; 364/DIG. 2; 364/927.2; 364/927.4; 364/927.66; 345/112; 345/189

[58] Field of Search ..................... 340/750, 799, 789, 790, 340/720; 364/DIG. 1, DIG. 2; 395/109, 110, 148, 550, 725, 162, 164

[56] References Cited

U.S. PATENT DOCUMENTS

| | | | |
|---|---|---|---|
| 4,180,805 | 12/1979 | Burson | 340/750 |
| 4,511,965 | 4/1985 | Rajaram | 364/200 |
| 4,595,996 | 6/1986 | Morley et al. | 364/900 |
| 4,622,547 | 11/1986 | Furukawa et al. | 340/750 |
| 4,646,077 | 2/1987 | Culley | 340/799 |
| 4,646,261 | 2/1987 | Ng | 364/900 |
| 4,660,155 | 4/1987 | Thaden et al. | 364/200 |
| 4,663,619 | 5/1987 | Staggs et al. | 340/799 |
| 4,686,521 | 8/1987 | Beaven et al. | 340/748 |
| 4,694,392 | 9/1987 | Ballard et al. | 364/200 |
| 4,695,967 | 9/1987 | Kodama et al. | 364/900 |
| 4,723,226 | 2/1988 | McDonough et al. | 364/900 |
| 4,755,814 | 7/1988 | Olsen | 340/799 |
| 4,782,462 | 11/1988 | Kaplinsky et al. | 364/900 |
| 4,789,963 | 12/1988 | Takahashi et al. | 364/900 |
| 4,815,033 | 3/1989 | Harris | 395/425 |

*Primary Examiner*—Thomas C. Lee
*Assistant Examiner*—John C. Loomis
*Attorney, Agent, or Firm*—Wolf, Greenfield & Sacks

[57] ABSTRACT

A character pattern data holding circuit includes a through latch. In a mode other than a character display mode, a gate of the through latch is opened according to an access command from the main system by making use of a data function of the through latch so that the main system and a second memory are directly connected to each other. In this way, display control timing restrictions are not imposed on the main system and access performance is enhanced.

3 Claims, 4 Drawing Sheets

DISPLAY CONTROL SYSTEM WITH MEMORY ACCESS TIMING BASED ON DISPLAY MODE

This application is a continuation, of application Ser. No. 343,048, filed Apr. 25, 1989, now abandoned.

BACKGROUND OF THE INVENTION

1. Field of the Invention

This invention relates to a display control system, which permits access to a memory for display data generation by a main system (for instance an external CPU or a personal computer system) according to a display mode command signal.

2. Description of the Prior Art

FIG. 4 is a block diagram showing a prior art display control system. Referring to the FIGURE, reference numeral 1 designates a display controller (CRTC), 2 a display data memory (VRAM) as first memory means for storing display data, 3 and 4 display data hold circuits (F/F) for temporarily holding display data read out from the VRAM 2, 5 a display data generation memory (CG) as second memory means for storing character pattern data, 6 an image data generation circuit (DGL), 7 a display unit (CRT), 8 a main system side character code hold circuit (F/F), which serves to hold character code data from the main system side and includes a counter for counting bytes of character pattern data corresponding to one character code, 9 a selector for selectively providing an output of either F/F 3 or F/F 8 to the CG 5, 10 a display data generation memory access circuit (DCNT) for permitting access of the CG 5 from the main system side and including an edge trigger flip-flop (F/F) 10*a* as character pattern data holding means, 11 display data memory access circuit (VRIF), 12 an access mode detection circuit, and 13 a display mode detection circuit.

FIG. 5 shows the image data generation circuit (DGL) 6 in detail. In the FIGURE, designated at 6*a* is a parallel-to-serial converter for graphics image, 6*b* an attribute data hold circuit, 6*c* a parallel-to-serial converter for character pattern, 6*d* a selector for character image, 6*e* a border color register, and 6*f* an image data selector.

FIG. 6 shows the display data generation memory access circuit (DCNT) 10 in detail. In the FIGURE, designated at 10*a* is the flip-flop for holding the character pattern data noted above, 10*b* a display data timing detection circuit, and 10*c* a data take-in timing signal generation circuit.

The operation of the circuit shown in FIG. 4 will now be described. The CRTC 1 provides a signal for controlling the display unit and a control signal for reading out display data of the VRAM 2 and timing signals to the DGL 6 and DCNT 10. From the main system, display data is supplied through the VRIF 11 to the VRAM 2. The CRTC 1 accesses the VRAM 2 and reads out data therefrom, the read-out data being temporarily held in the hold circuits F/F 3 and F/F 4. The subsequent operation is determined depending on display modes. As the display modes, there is a character display mode and a usual graphics display mode other than the character display mode. In the character display mode, character code data is held in the F/F 3, and attribute data in F/F 4. The selector 9 is adapted such that it usually selects an output of the F/F 3. The character code data from the F/F 3 is supplied through the selector 9 to the CG 5 which then provides corresponding character pattern data. This character pattern data and the attribute data from the F/F 4 are supplied to the DGL 6 which produces from these data image data to be provided to the CRT 7. In the case of the graphics display mode, the outputs of the F/Fs 3 and 4 are directly supplied to the DGL 6 which then produces image data supplied to the CRT 7. The DGL 6 receives a signal from the display mode detection circuit 13 to effect switching between character image data and graphics image data.

Referring to FIG. 5, in the graphics display mode the VRAM 2 contains graphic display data. This data is temporarily held in the F/Fs 3 and 4 and then supplied to the parallel-to-serial converter 6*a* for graphics image. As a result, graphics image data is generated and supplied to the image data selector 6*f*. In the character display mode, the VRAM 2 contains character display data, and,-as noted before, character code data is held in the F/F 3 and attribute data in the F/F 4. With the output of the F/F 3 the CG 5 is accessed through the selector 9, and read-out character pattern data is held in the parallel-to-serial converter 6*c* for character pattern. Meanwhile, the attribute data from the F/F 4 is held in the attribute data hold circuit 6*b* and supplied to the selector 6*d* for character image. In the selector 6*d* character color data and background color data in the attribute data are selected according to the output of the parallel-to-serial converter 6*c*, then the selected data is supplied to the video data selector 6*f*. The border color register 6*e* contains data for determining a display color of border area. As shown in FIG. 7, the face area 7*a* on the screen of the CRT 7 consists of an intrinsic display area 7*b* and a border area 7*c* surrounding the display area 7*b*. The CRTC 1 supplies a signal for selecting either the display area 7*b* or the border area 7*c* to switch the image data selector 6*f*. A signal representing a display mode is supplied from the display mode detection circuit 13, and the video data selector 6*f* selects either graphics image data or character image data to be provided to the display area 7*b*.

The operation will now be described in connection with the case when the main system accesses the CG 5. FIG. 8 shows a timing signal DE which is supplied from the CRTC 1 to the timing detection circuit 10*b* in the DCNT 10. There are two access modes, i.e., an access mode I, in which the main system can access to the CG 5 only during a non-display period t2, and an access mode II, in which the main system can access to the CG 5 at all time, i.e., during either a display period t1 or the non-display period t2. Either access mode is set in the access mode detection circuit 12. In either mode, when character code data is written in the F/F 8 from the main system, the F/F 8 supplies data to the CG 5, whereby corresponding character pattern data is provided. This data is taken in the DCNT 10 and transmitted to the main system under control of a timing signal form the CRTC 1. On the other hand, the main system can transmit character pattern data to the CG 5. When character code data and character pattern data are written from the main system in the F/F 8 and DCNT 10 respectively the character pattern data is transmitted to the CG 5 by a timing signal of the CRTC1. In the character display mode, during the display period the CG 5 should receive the character code data from the F/F 3 through the selector 9 for display data generation and supply corresponding character pattern data to the DGL 6. While there are two different access modes, in the access mode I access of the main system is allowed only during the non-display period t2. The non-display period t2, however, is as short as a fraction of the display period t1. Therefore, the access performance is inferior. In the other access mode II, even during the display period the selector 9 is switched to the side of the F/F 8 in response to an access from the main system, thus improving the access performance. However, in this case data of the main system is transmitted to the DGL 6 as well during the display period, thus resulting in disturbance of the display.

Further detailed description will be given with reference to FIG. 6. The access mode I is the same as the access mode II except for that access is inhibited during the display period. For this reason, the access mode II will be described in detail. FIG. 9 shows a timing signal a which is obtained by dividing a character clock from the CRTC 1 into two. This signal is generated in the data take-in timing signal generation circuit 10*c*. First, data representing the character display mode is set in the display mode detection circuit 13, and data representing the access mode II is set in the access mode detection circuit 12. Character code data is written from the main system into the F/F 8. When the data take-in timing generation circuit 10*c* detects the writing of the character code data in the F/F 8 from the rising of the timing signal $\alpha$,the selector 9 provides the data from the F/F 8 to the CG 5. The CG 5 accordingly provides corresponding character pattern data to the flip-flop 10*a*. The character pattern data is held in the flip-flop 10*a* with the falling of the timing signal $\alpha$, the held data is then read out by the main system. Meanwhile, with the falling of the timing signal $\alpha$ a counter in the F/F 8 starts up-counting. Since the character pattern data consists of several bytes per character, after setting of one character code the main system should read out several bytes. These several bytes are set by the counter in the F/F 8. Unless the main system reads out data from the flip-flop 10*a*, new clock for holding of data in the CG 5 is not provided from the data take-in timing generation circuit 10*c* to the flip-flop 10*a*. Thus, data is preserved in the flip-flop 10*a*, and the data is normally transferred to the main system. When the data is read out from the flip-flop 10*a*, the main system provides a command (i.e., I/O read signal).

In the case of the graphics display mode, the CG 5 is accessed in the manner as described above. In the case of the graphics display mode, the CG 5 is not directly accessed by graphics image data, so that in the access mode II there is no possibility of disturbance of the display, thus improving the access performance. Again in this case, the timing signal from the CRTC 1 is used as the timing of input of data to the DCNT 10 when reading out the character pattern data after writing of data in the F/F 8 and also as timing of input of data to the CG 5 when writing data.

With the above construction of the prior art display control system, even in the case other than the character display mode, in which the CG 5 is unnecessary, the access to the CG 5 by the main system for reading and writing data is done under control of the timing signal from the CRTC 1, so that it is subject to that timing restriction, thus correspondingly limiting the access performance.

SUMMARY OF THE INVENTION

This invention has been intended in order to solve the above problems, and its object is to provide a display control system, in which in a mode other than the character display mode the main system is allowed to make, without any timing restriction, access to second memory means which stores character pattern data. In the display control system according to the invention, a through latch is provided as character pattern data holding means, and there is provided timing signal generation means for generating a timing signal for the control of the through latch not according to a timing from the display controller but according to an access command from the main system in a mode other than the character display mode. The through latch is controlled depending on a display mode. More specifically, in the character display mode it is controlled according to a timing from the display controller, and in a mode other than the character display mode it is controlled according to an independent timing from the timing signal generation means on the basis of an access command from the main system. In a mode other than the character display mode, access means for permitting access of the second memory means from the main system is perfectly separated from the display timing to permit high speed access from the main system.

The above and other objects, features and advantages will become more apparent from the following description when taken in conjunction with the accompanying drawings.

DESCRIPTION OF THE PREFERRED EMBODIMENT

Figure 1:
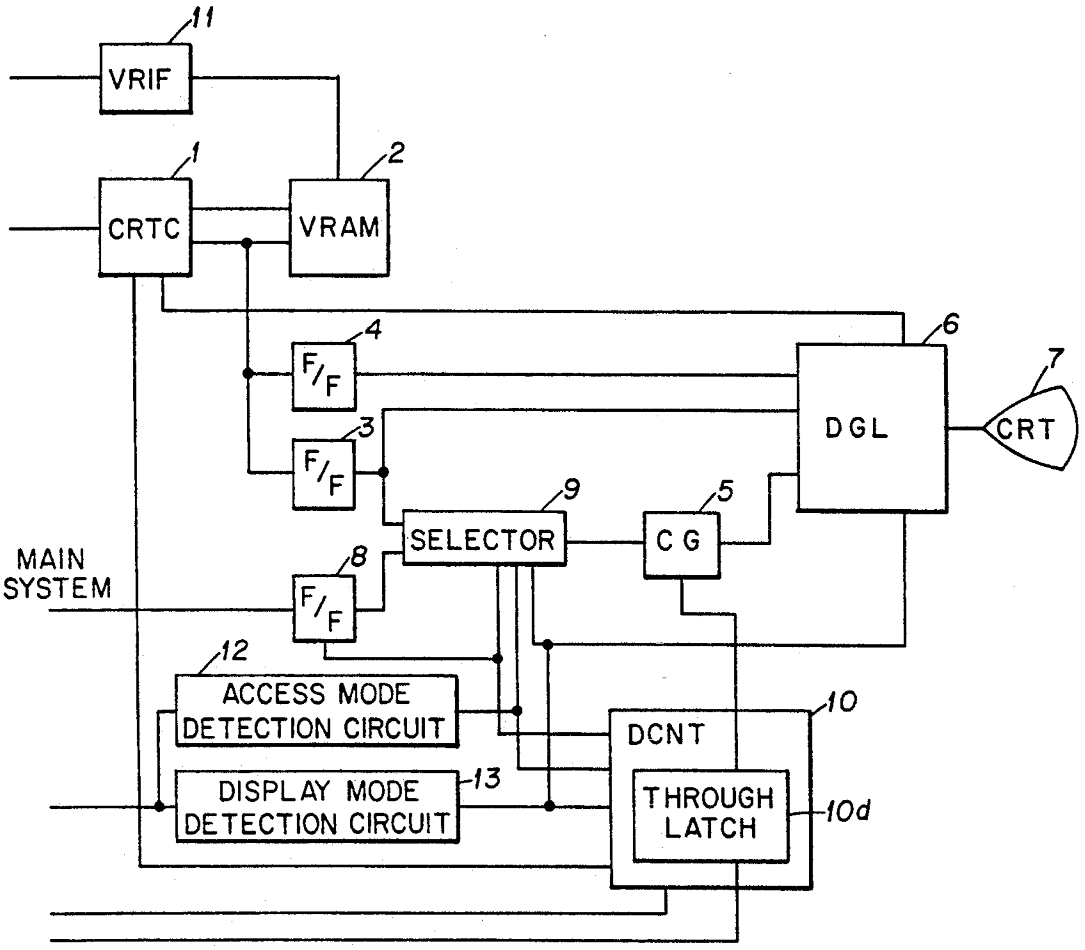
FIG. 1 is a block diagram showing an embodiment of the invention.

Now, an embodiment of the invention will be described with reference to the drawings. Parts like or corresponding to those in the prior art system are designated by like reference numerals with omission of the description.

FIG. 1 is a block diagram showing the construction of the embodiment. As shown in the FIGURE, a through latch 10*d* is provided as character pattern data holding means in a display data generation memory access circuit (DCNT) 10. An output of a display mode detection circuit 13 is also supplied to a selector 9. The selector 9 is adapted to select an output of a F/F 8 in a mode other than the character display mode.

Figure 2:
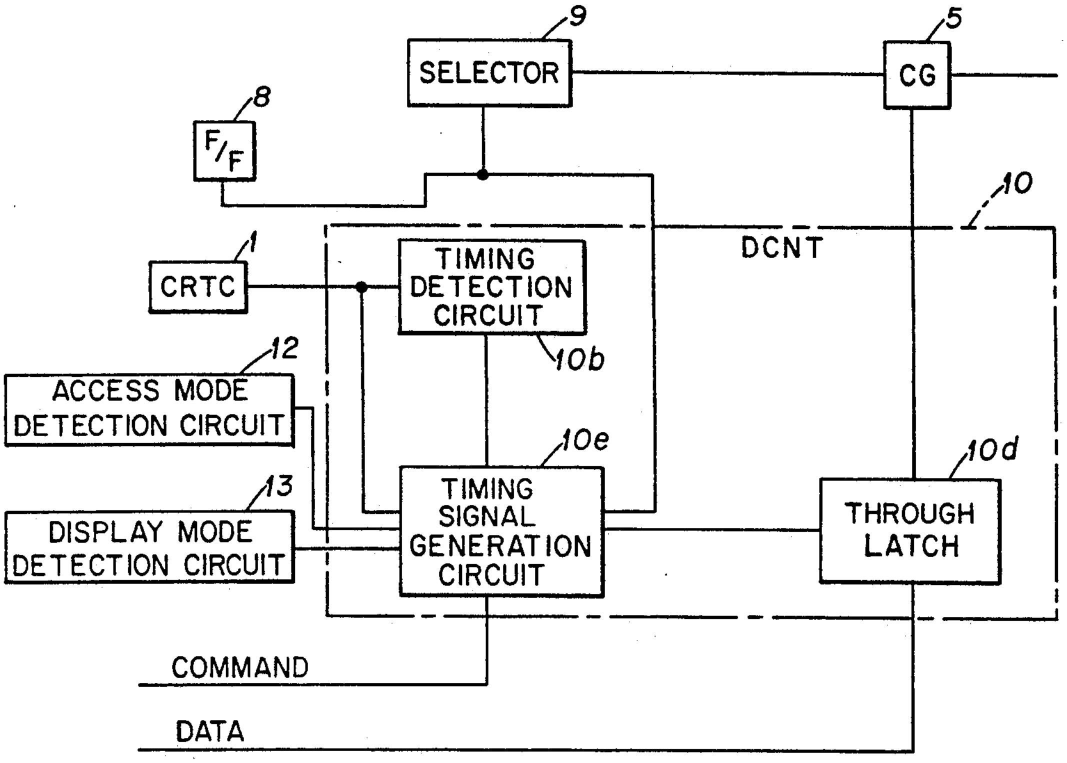
FIG. 2 is a block diagram showing an essential part of the same embodiment.
Figure 3:
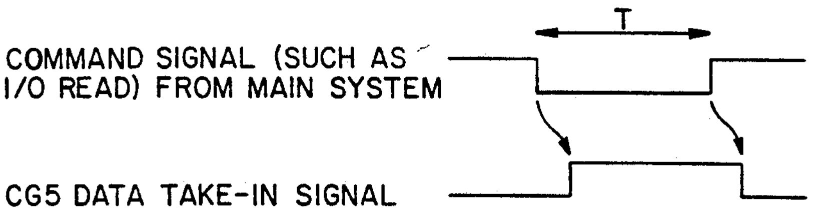
FIG. 3 is a timing chart for explaining the operation of the embodiment.
Figure 4:
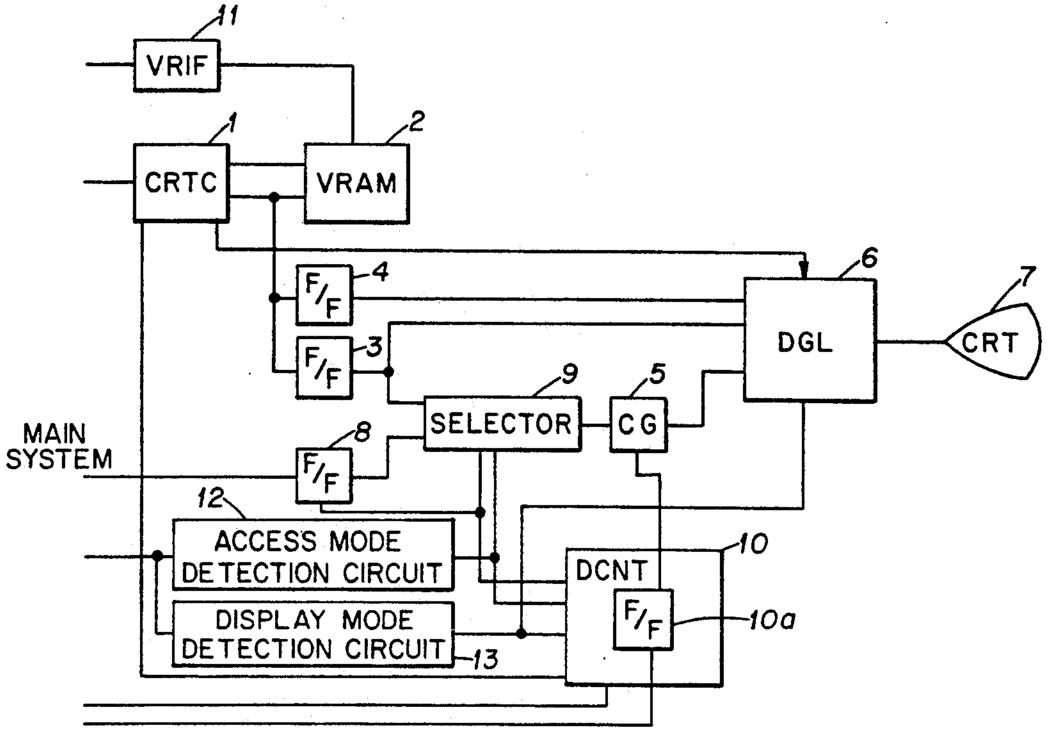
FIG. 4 (PRIOR ART)
FIG. 4 is a block diagram showing a prior art system.
Figure 5:
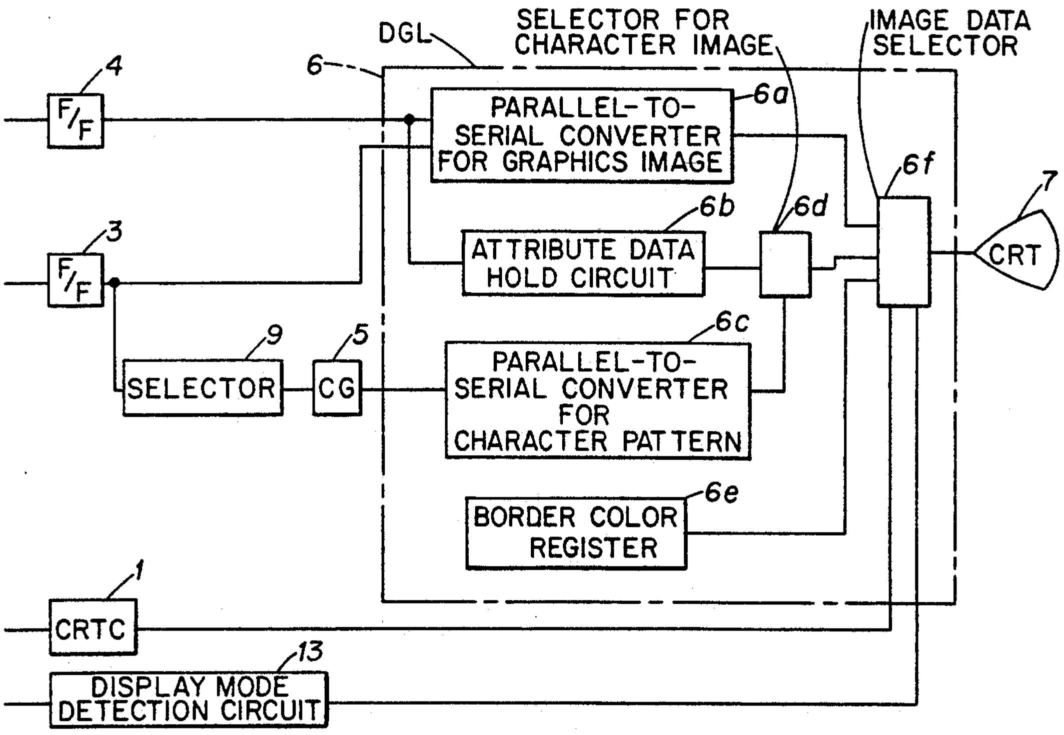
FIG. 5 (PRIOR ART)
FIGS. 5 and 6 are block diagrams showing essential parts of the same prior art system.
Figure 6:
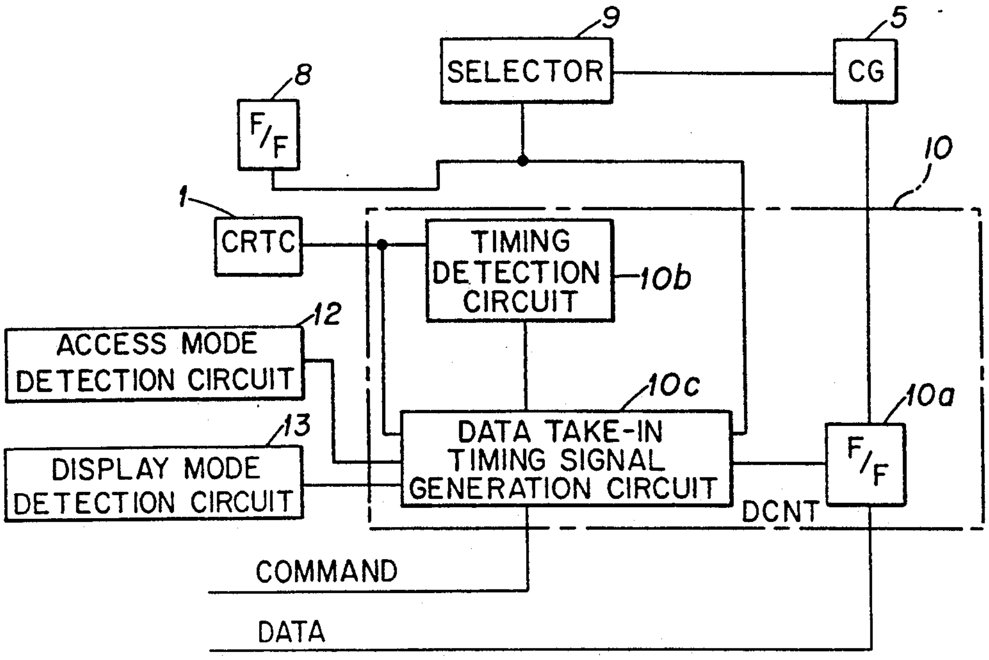
FIG. 6 (PRIOR ART)
Figure 7:
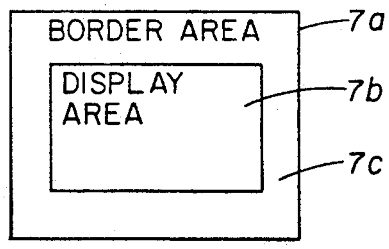
FIG. 7 (PRIOR ART)
FIG. 7 is a view showing the screen structure of a display unit.
Figure 8:
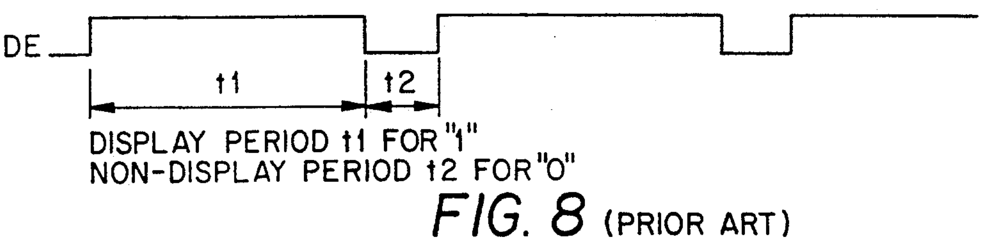
FIG. 8 (PRIOR ART)
FIGS. 8 and 9 are timing charts for explaining the operation of the prior art system.
Figure 9:
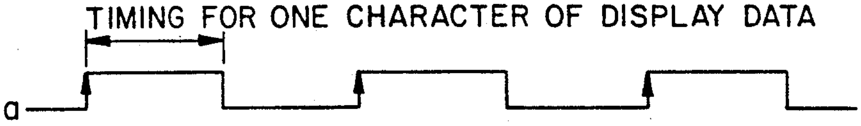
FIG. 9 (PRIOR ART)

FIG. 2 shows the DCNT 10 in detail. In the DCNT 10, the character pattern data holding means is constituted by the through latch 10*d*. A data take-in timing signal generation circuit 10*e*, unlike the prior art system, is constructed such that in a mode other than the character display mode it generates and provides a data take-in signal not according to any timing signal from the CRTC 1 but in correspondence to a command signal (for instance I/O read signal) from the main system as shown in FIG. 3.

The operation will now be described.

With the prior art system, when the main system accesses a CG 5, transfer of data requires a data take-in timing signal at all times since the character pattern data holding means of the DCNT 10 consists of an edge trigger flip-flop (F/F) 10*a*, so that it is done under control of the CRTC 1 for timing signal generation. In contrast, according to the invention the, through latch 10*d* is provided in lieu of the edge trigger flip-flop 10*a*. In the case of the edge trigger flip-flop 10*a*, the output signal is changed with the rising edge of the timing signal. In the case of the through latch 10*d*, when the timing signal is "H" an input is directly provided as an output, and data is held with the falling of the timing signal. This function is utilized.

In the character display mode, as in the prior art, both access modes I and II are subject to timing restrictions, and in the access mode II disturbance of the display occurs. However, in a mode other than the character display mode, i.e., in a mode which does not require the CG 5 for the image data generation such as a graphics display mode, the main system can access the CG 5 without timing control of the CRTC 1. More particularly, when the display mode detection circuit 13 recognizes a mode other than the character display mode, the selector 9 selects the F/F 8, and its output is supplied to the CG 5. Further, the timing signal of the through latch 10*d* in the DCNT 10 is fixed to "H" according to a command from the main system. The through latch 10*d* serves as a mere gate, and its input is directly provided as an output. This means that the main system is directly connected to the CG 5 and is subject to no timing restriction at all. More particularly, the CG 5 is perfectly separated from the circuit other than that for the image generation, so that it can be freely accessed from the main system like a mere memory.

A further detailed description will now be given with reference to FIG. 2. What takes place in the character display mode is the same as in the prior art system, so that the description will be given in conjunction with other mode, i.e., graphics display mode.

When the graphics display mode is set in the display mode detection circuit 13, the data take-in timing generation circuit 10*e* is perfectly separated from a display timing detection circuit 10*b* and the CRTC 1. An access mode detection circuit 12 is ignored irrespective of the access modes I or II is set. The main system first sets character code data in the F/F 8. Then, a command for taking in data of the CG 5 is provided to the data take-in timing generation circuit 10*e*. The width or duration T of the command (see FIG. 3) is longer than the access time of the CG 5, so that the character pattern data of the CG 5 is supplied to the through latch 10*d*. In this mode, the CG 5 data take-in signal from the data take-in timing generation circuit 10*e* to the through latch 10*d* is "H", so that the function of holding the through latch 10*d* is not operated, and only the gate function is provided. More particularly, when a command signal is provided from the main system, the CG 5 data take-in signal from the data take-in timing generation circuit 10*e* goes to "H" to open the gate of the through latch 10*d*, so that data is transmitted to the main system. Meanwhile, a counter in the F/F 8 performs up-counting in response to the rising of the command signal, i.e., the falling of the CG 5 data take-in signal.

It will be seen that the access to the CG 5 from the main system, which has been effected under control of the timing of the display control system in the prior art, can be effected according to the invention without any timing restriction as if the CG 5 is an ordinary memory.

The above embodiment has been concerned with the CG 5, i.e., a memory for display data generation, as second memory means. However, the invention is also applicable to the case where a display data memory is provided for each display mode.

As has been described in the foregoing, according to the invention character pattern data holding means is constituted by a through latch, and timing signal generation means is provided, which generates a timing signal to control the through latch not according to a timing from a display controller but on the basis of an access command from a main system in a mode other than the character display mode, so that in a mode other than the character display mode the main system can access a second memory means as a mere memory without any other timing restriction. It is thus possible to enhance the access performance of the second memory means and enhance performance inclusive of the main system.

What is claimed is:

1. A display control system responsive to a main system, for controlling operation of a video display system, the video display system having at least a character display mode for causing the video display system to display characters selected from a predetermined set of characters defined by character pattern data and a non-character display mode for causing the video display system to display images corresponding to graphical data, the main system providing at least main system timing signals and character pattern data, the display control system comprising:

a memory for storing the character pattern data;

means connected to the main system for detecting which one of character display mode and non-character display mode the video display system is in;

a display controller connected to the main system for receiving the main system timing signals and the character pattern data from the main system and including means for generating display control timing signals, and transfer means having means connected to the main system for receiving the character pattern data from the main system, means connected to the means for generating display timing control signals for receiving display timing control signals, means connected to the main system for receiving main system timing signals, means connected to the means for detecting for receiving therefrom an indication of which one of character display mode and non-character display mode the video display system is in, and means connected to the means for receiving an indication for providing received character pattern data to the memory, whereby said transfer means transfers the character pattern data from the main system to the memory in accordance with the display control timing signals when the video display system is in the character display mode and in accordance with the main system timing signals when the video display system is in the non-character display mode.

2. A display control system as recited in claim 1, wherein the means for transferring further comprises:

means for generating transfer timing signals, responsive to the means for detecting, the main system timing signals and the display control timing signals; and means for receiving the character pattern data from the main system and for transferring the character pattern data to the memory in response to the transfer timing signals.

3. A display control system responsive to a main system, for controlling operation of a video display system, the video display system having at least a character display mode for causing the video display system to display characters selected from a predetermined set of characters defined by character pattern data and a non-character display mode, for causing the video display system to display images corresponding to graphical data, the main system providing main system timing signals and character pattern data, the display control system comprising:

a memory for storing the character pattern data;

means connected to the main system for detecting which one of character display mode and non-character display mode the video display system is in;

a display controller for receiving the main system timing signals and the character pattern data from the main system and including a through latch, means for generating display control timing signals, means connected to the means for detecting which one of character display mode and non-character display mode the video display system is in, to the means for generating and to the main system, for controlling through latch timing by generating a through latch timing control signal in accordance with the display control timing signals when the video display system is in the character display mode and in accordance with the main system timing signals when the video display system is in the non-character display the through latch having means connected to the main system for receiving the character pattern data from the main system, means connected to the means for controlling through latch timing receiving the through latch timing control signal, and means connected thereto and responsive thereto for providing received character pattern data to the memory, whereby said through latch transfers the character pattern data form the main system to the memory in accordance with the display control timing signals when the video display system is in the character display mode and in accordance with the main system timing signals when the video display system is in the non-character display mode.

* * * * *